United States Patent
Natsui et al.

(10) Patent No.: US 10,783,294 B2
(45) Date of Patent: Sep. 22, 2020

(54) SYSTEM, METHOD, AND NON-TRANSITORY COMPUTER READABLE RECORDING MEDIUM STORING A PROGRAM RECORDED THEREON FOR SUPPORTING A DESIGN OF A CIRCUIT INCLUDING A STOCHASTIC OPERATION ELEMENT

(71) Applicant: TOHOKU UNIVERSITY, Sendai-shi, Miyagi (JP)

(72) Inventors: Masanori Natsui, Sendai (JP); Akira Tamakoshi, Sendai (JP); Takahiro Hanyu, Sendai (JP); Akira Mochizuki, Sendai (JP); Tetsuo Endoh, Sendai (JP); Hiroki Koike, Sendai (JP); Hideo Ohno, Sendai (JP)

(73) Assignee: TOHOKU UNIVERSITY, Sendai-shi (JP)

( * ) Notice: Subject to any disclaimer, the term of this patent is extended or adjusted under 35 U.S.C. 154(b) by 0 days.

(21) Appl. No.: 16/323,146

(22) PCT Filed: Aug. 3, 2017

(86) PCT No.: PCT/JP2017/028321
§ 371 (c)(1),
(2) Date: Mar. 4, 2019

(87) PCT Pub. No.: WO2018/025972
PCT Pub. Date: Feb. 8, 2018

(65) Prior Publication Data
US 2019/0243929 A1  Aug. 8, 2019

(30) Foreign Application Priority Data

Aug. 4, 2016 (JP) .................................. 2016-153285

(51) Int. Cl.
*G06F 17/50* (2006.01)
*G06F 30/327* (2020.01)
(Continued)

(52) U.S. Cl.
CPC ............ *G06F 30/327* (2020.01); *G06F 30/00* (2020.01); *G06F 30/398* (2020.01)

(58) Field of Classification Search
CPC ..... G06F 17/50; G06F 17/505; G06F 17/5081
(Continued)

(56) References Cited

U.S. PATENT DOCUMENTS

| 6,456,992 B1* | 9/2002 | Shibata et al. ....... G06N 3/0635 706/33 |
| 2018/0204131 A1* | 7/2018 | Najafi et al. ........... G06N 7/005 |

FOREIGN PATENT DOCUMENTS

| JP | 2014-225134 A | 12/2014 |
| JP | 2015-109010 A | 6/2015 |
| WO | 2014/030490 A1 | 2/2014 |

OTHER PUBLICATIONS

Oct. 17, 2017 International Search Report issued in International Patent Application No. PCT/JP2017/028321.
(Continued)

*Primary Examiner* — Sun J Lin
(74) *Attorney, Agent, or Firm* — Oliff PLC (57) ABSTRACT

A circuit design support system, a circuit design support method, a circuit design support program, and a recording medium having the program recorded thereon are provided by which a design can be performed in consideration of the stochastic operation of the stochastic operation element and the influence caused by the stochastic operation of the stochastic operation element on the operation reliability of the circuit can be evaluated.

9 Claims, 8 Drawing Sheets

(51) Int. Cl.
    *G06F 30/00*      (2020.01)
    *G06F 30/398*    (2020.01)

(58) Field of Classification Search
    USPC .................................................. 716/100, 102
    See application file for complete search history.

(56) References Cited

OTHER PUBLICATIONS

Feb. 5, 2019 International Preliminary Report on Patentability issued in International Patent Application No. PCT/JP2017/028321.
M. Natsui et al. "Stochastic Behavior-Considered VLSI CAD Environment for MTJ/MOS-Hybrid Microprocessor Design". 2016 IEEE International Symposium on Circuits and Systems (ISCAS), May 25, 2016, pp. 1878-1881.
G. Di Pendina et al. "A Hybrid Magnetic/Complementary Metal Oxide Semiconductor Process Design Kit for the Design of Low-Power Non-Volatile Logic Circuits". Journal of Applied Physics 111, 07E350 [online], 2012, pp. 1-3, [retrieval date: Sep. 29, 2017], URL: <http://aip.scitation.org/doi/10.1063/1.3680013>.

\* cited by examiner

(a) Design of target circuit (b) Replacement of storage circuits with nonvolatile storage circuits (c) Operation verification by analog/digital simulation

SYSTEM, METHOD, AND NON-TRANSITORY COMPUTER READABLE RECORDING MEDIUM STORING A PROGRAM RECORDED THEREON FOR SUPPORTING A DESIGN OF A CIRCUIT INCLUDING A STOCHASTIC OPERATION ELEMENT

FIELD OF THE INVENTION

The present invention relates to a circuit design support system, a circuit design support method, a circuit design support program, and a computer readable recording medium having the program recorded thereon.

DESCRIPTION OF RELATED ART

Figure 8:
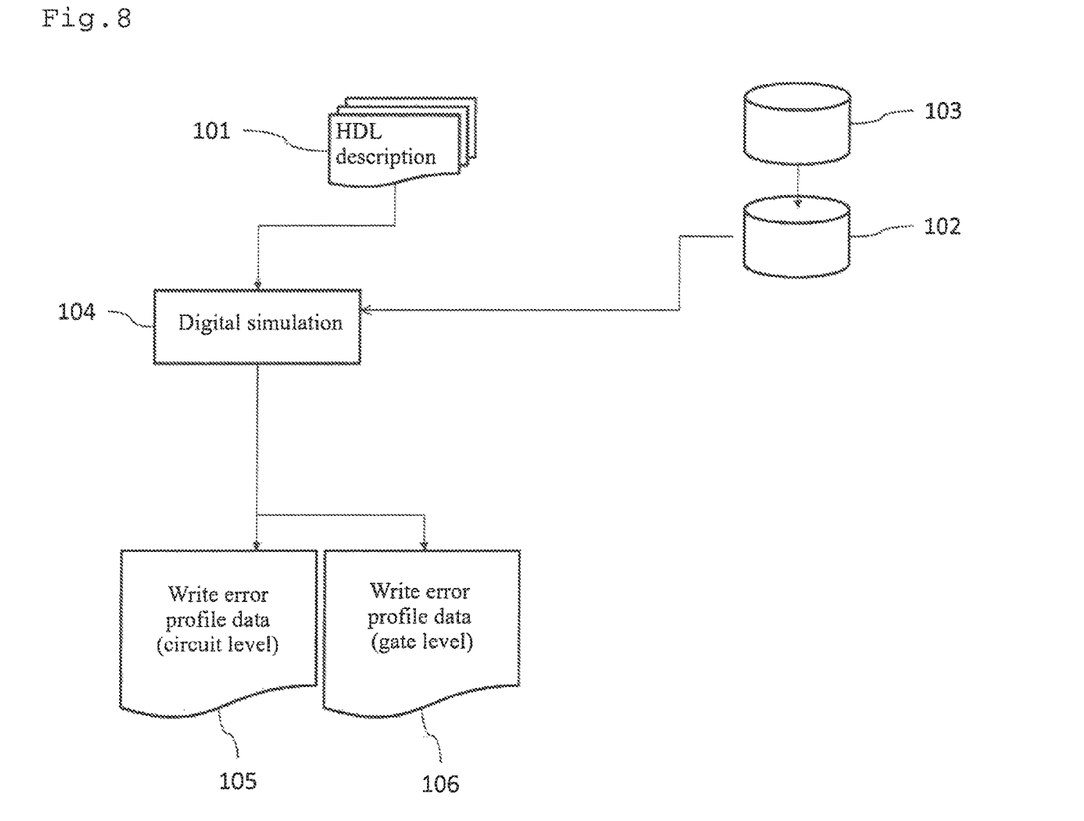
FIG. 8 is a block diagram illustrating the configuration of a conventional circuit design support system.

A conventional circuit design support system is configured to evaluate a designed circuit based on the flow shown in FIG. 8 for example. The conventional circuit design support system shown in FIG. 8 is configured to use digital simulation to logically synthesize circuit information 101 described in hardware description language (HDL) and a logic gate library 102 such as CMOS to thereby evaluate the operation of each logic gate and the circuit. The logic gate library 102 includes information showing the operation of each logic gate calculated based on an analog operation model 103 of semiconductor elements included in the circuit. The operation evaluation is carried out by using digital simulation 104 to calculate the outputs from the entire circuit and each logic gate to compare the resultant values with the respective ideal values to thereby output circuit-level write error profile data 105 and gate-level write error profile data 106, respectively for example. Based on the operation evaluation of the respective pieces of write error profile data 105 and 106, the circuit operation can be confirmed or the design can be changed. The conventional circuit design support system shown in FIG. 8 can be implemented by software such as SPICE or HSPICE (made by Synopsys).

In the case of the conventional circuit design support system as shown in FIG. 8, the logic gate library 102 is configured to have information showing the operations of the respective logic gates while having possible operation conditions completely correspond to element values so as to allow each semiconductor element to always have a predetermined element value corresponding to a certain operation condition, alternatively to always have other predetermined element values corresponding to other certain operation conditions. This configuration prevents a situation where the calculation result changes depending on every arithmetic operation.

Such conventional circuit design support systems include, for example, a suggested design support system for a nonvolatile logic integrated circuit (see Patent Publication 1 for example) according to which the logic synthesis can be performed upon the netlist for a nonvolatile logic integrated circuit obtained by combining a nonvolatile logic gate and a volatile logic gate as well as a suggested circuit design support system (see Patent Publication 2 for example) according to which such a semiconductor device can be designed that can minimize the consumption energy by using a DVFS control for actively controlling an operation frequency and an operation voltage.

CITATION LIST

Patent Literature 1: Japanese Unexamined Patent Application Publication 2014-225134
Patent Literature 2: Japanese Unexamined Patent Application Publication 2015-109010

SUMMARY OF THE INVENTION

Among elements used for a nonvolatile logic integrated circuit, an MTJ (Magnetic Tunnel Junction) element for example is a nonvolatile storage element for which the status (resistance value) changes when a pulse width and a current amount having a certain magnitude are applied thereto and is an element for which, even when an applied write current has fixed pulse width and current amount, whether or not the write processing succeed is determined stochastically. When such a circuit is designed to include a stochastic operation element for which a change of the element value (the resistance value in the case of the MTJ element) is determined stochastically, in the conventional circuit design support system as shown in FIG. 8, the logic gate library is configured to have information showing the operations of the respective logic gates while having possible operation conditions completely correspond to element values by performing such operations that, when a probability of a change of the element value of a stochastic operation element is equal to or more than a certain value, then the probability is increased to 100% and, when the probability is equal to or less than a certain value, then the probability is decreased to 0%, for example.

In the case of an actual circuit however, a stochastic operation element included in the circuit does not always show a value set in advance in the logic gate library and shows an element value determined by the stochastic operation. This may cause a case where output from each logic gate and the circuit is different from the result at the design stage. Thus, the conventional circuit design support system does not take into consideration at all the stochastic operation of a stochastic operation element in the design of a circuit including the stochastic operation element. Thus, a disadvantage has been caused where a stable operation is significantly prevented from being secured. In such a case, the circuit must be evaluated for the operation reliability. However, no systems have existed to perform such an evaluation.

The present invention has been made in view of the disadvantage as described above. It is an objective of the invention to provide a circuit design support system, a circuit design support method, a circuit design support program, and a computer readable recording medium having the program recorded thereon by which the design can be achieved that takes into consideration the stochastic operation of the stochastic operation element and such an influence can be evaluated that is caused by the stochastic operation of the stochastic operation element to act on the operation reliability of the circuit.

In order to achieve the above objective, the invention provides a circuit design support system according to the present invention to support the design of a circuit including a stochastic operation element for which a change of an element value is determined stochastically. The circuit design support system includes: a storage means storing therein in advance an analog operation model having information stochastically showing a change of an element value of the stochastic operation element, a stochastic operation gate library having information showing an operation based on the stochastic change of the element value of the stochastic operation element of a logic gate including the stochastic operation element, and a logic gate library having information showing an operation of a logic gate not including the stochastic operation element; a digital evaluation means for logically synthesizing circuit information described in a hardware description language (HDL) corresponding to the circuit, the stochastic operation gate library stored in the storage means, and the logic gate library stored in the storage means to perform the operation evaluation of each logic gate and the circuit; and an analog evaluation means for performing the operation evaluation of the stochastic operation element based on the circuit information, the analog operation model stored in the storage means, the stochastic operation gate library stored in the storage means, and the logic gate library stored in the storage means.

The circuit design support method according to the present invention is a circuit design support method for supporting the design of a circuit including a stochastic operation element for which a change of an element value is determined stochastically. The circuit design support method has: a storage step of storing in advance an analog operation model having information stochastically showing a change of an element value of the stochastic operation element, a stochastic operation gate library having information showing an operation based on the stochastic change of the element value of the stochastic operation element of a logic gate including the stochastic operation element, and a logic gate library having information showing an operation of a logic gate not including the stochastic operation element; a digital evaluation step of logically synthesizing circuit information described in a hardware description language (HDL) corresponding to the circuit, the stochastic operation gate library stored in the storage step, and the logic gate library stored in the storage step to perform the operation evaluation of each logic gate and the circuit; and an analog evaluation step of performing the operation evaluation of the stochastic operation element based on the circuit information, the analog operation model stored in the storage step, the stochastic operation gate library stored in the storage step, and the logic gate library stored in the storage step.

A circuit design support program according to the present invention is a circuit design support program for supporting the design of a circuit including a stochastic operation element for which a change of an element value is determined stochastically. The circuit design support program allows a computer to function as: a storage means storing therein in advance an analog operation model having information stochastically showing a change of an element value of the stochastic operation element, a stochastic operation gate library having information showing an operation based on the stochastic change of the element value of the stochastic operation element of a logic gate including the stochastic operation element, and a logic gate library having information showing an operation of a logic gate not including the stochastic operation element; a digital evaluation means for logically synthesizing circuit information described in a hardware description language (HDL) corresponding to the circuit, the stochastic operation gate library stored in the storage means, and the logic gate library stored in the storage means to perform the operation evaluation of each logic gate and the circuit; and an analog evaluation means for performing the operation evaluation of the stochastic operation element based on the circuit information, the analog operation model stored in the storage means, the stochastic operation gate library stored in the storage means, and the logic gate library stored in the storage means.

A computer readable recording medium having the circuit design support program according to the present invention recorded thereon is a computer readable recording medium having a circuit design support program recorded thereon to support the design of a circuit including a stochastic operation element for which a change of an element value is determined stochastically. The computer readable recording medium has a circuit design support program recorded thereon that allows a computer to function as: a storage means storing therein in advance an analog operation model having information stochastically showing a change of an element value of the stochastic operation element, a stochastic operation gate library having information showing an operation based on the stochastic change of the element value of the stochastic operation element of a logic gate including the stochastic operation element, and a logic gate library having information showing an operation of a logic gate not including the stochastic operation element; a digital evaluation means for logically synthesizing circuit information described in a hardware description language (HDL) corresponding to the circuit, the stochastic operation gate library stored in the storage means, and the logic gate library stored in the storage means to perform the operation evaluation of each logic gate and the circuit; and an analog evaluation means for performing the operation evaluation of the stochastic operation element based on the circuit information, the analog operation model stored in the storage means, the stochastic operation gate library stored in the storage means, and the logic gate library stored in the storage means.

A circuit design support system, a circuit design support method, a circuit design support program, and a computer readable recording medium having the program recorded thereon according to the present invention can perform the operation evaluation of each logic gate and the circuit based on a stochastic operation gate library having information showing the operation of a logic gate including a stochastic operation element based on the stochastic change of the element value of the stochastic operation element and a logic gate library having information showing the operation of a logic gate not including a stochastic operation element. Based on an analog operation model having information stochastically showing a change of an element value of the stochastic operation element, the stochastic operation gate library, and the logic gate library, the operation evaluation of the stochastic operation element can be performed. This can consequently provide the evaluation of the influence due to the stochastic operation of the stochastic operation element on the operation reliability of the stochastic operation element at the respective levels of the stochastic operation element, each logic gate, and the circuit. Based on this evaluation, such a design taking into consideration the stochastic operation of the stochastic operation element can be achieved such as a circuit intended to achieve the maximum performance of the stochastic operation element.

According to the circuit design support system, the circuit design support method, the circuit design support program, and a computer readable recording medium having the program recorded thereon according to the present invention, the analog evaluation means or the analog evaluation step is preferably configured to calculate an input signal to the stochastic operation element based on the circuit information, the stochastic operation gate library, and the logic gate library to use the input signal to perform the operation evaluation of the stochastic operation element based on the analog operation model. In this case, the operation evaluation of the stochastic operation element in the designed circuit can be performed accurately.

According to the circuit design support system, the circuit design support method, the circuit design support program, and a computer readable recording medium having the program recorded thereon according to the present invention, the analog evaluation means or the analog evaluation step is configured to perform the operation evaluation by calculating the element value of the stochastic operation element to compare the element value with an ideal value. The digital evaluation means or the digital evaluation step is preferably configured to perform the operation evaluation by calculating the output value of each logic gate and the output value of the circuit to compare the respective output values with the respective ideal values. In this case, the operation evaluation can be performed clearly. Differences between the calculated element value of the stochastic operation element, the output value of each logic gate, and the output value of the circuit and the respective ideal values may be outputted as the respective pieces of write error profile data for example.

According to the circuit design support system, the circuit design support method, the circuit design support program, and a computer readable recording medium having the program recorded thereon according to the present invention, the digital evaluation means or the digital evaluation step is preferably configured to use the element value of the stochastic operation element calculated by the analog evaluation means or the analog evaluation step to calculate the output value of each logic gate and the output value of the circuit. In this case, the stochastic operation by the stochastic operation element can be appropriately reflected upon the operation evaluation of each logic gate and the entire circuit.

The present invention can provide a circuit design support system, a circuit design support method, a circuit design support program, and a computer readable recording medium having the program recorded thereon by which the design can be performed in consideration of the stochastic operation of the stochastic operation element and such an influence can be evaluated that is caused by the stochastic operation of the stochastic operation element upon the operation reliability of the circuit.

BRIEF DESCRIPTION OF THE DRAWINGS

FIGS. 4(a), 4(b), and 4(c) relate to the circuit design support system of an embodiment of the present invention and the simulation to confirm that the stochastic operation element performs the stochastic operation.

DETAILED DESCRIPTION OF THE INVENTION

The following section will describe an embodiment of the present invention based on the drawings.

FIG. 1 to FIG. 8 illustrate a circuit design support system, a circuit design support method, a circuit design support program, and a computer readable recording medium having the program recorded thereon of an embodiment of the present invention. The circuit design support method of the embodiment of the present invention is a method preferably carried out using the circuit design support system of the embodiment of the present invention. This method can be carried out by a computer using a computer readable recording medium having the circuit design support program recorded thereon (e.g., a hard disk, DVD-ROM, CD-ROM, or a flexible disk).

Figure 1:
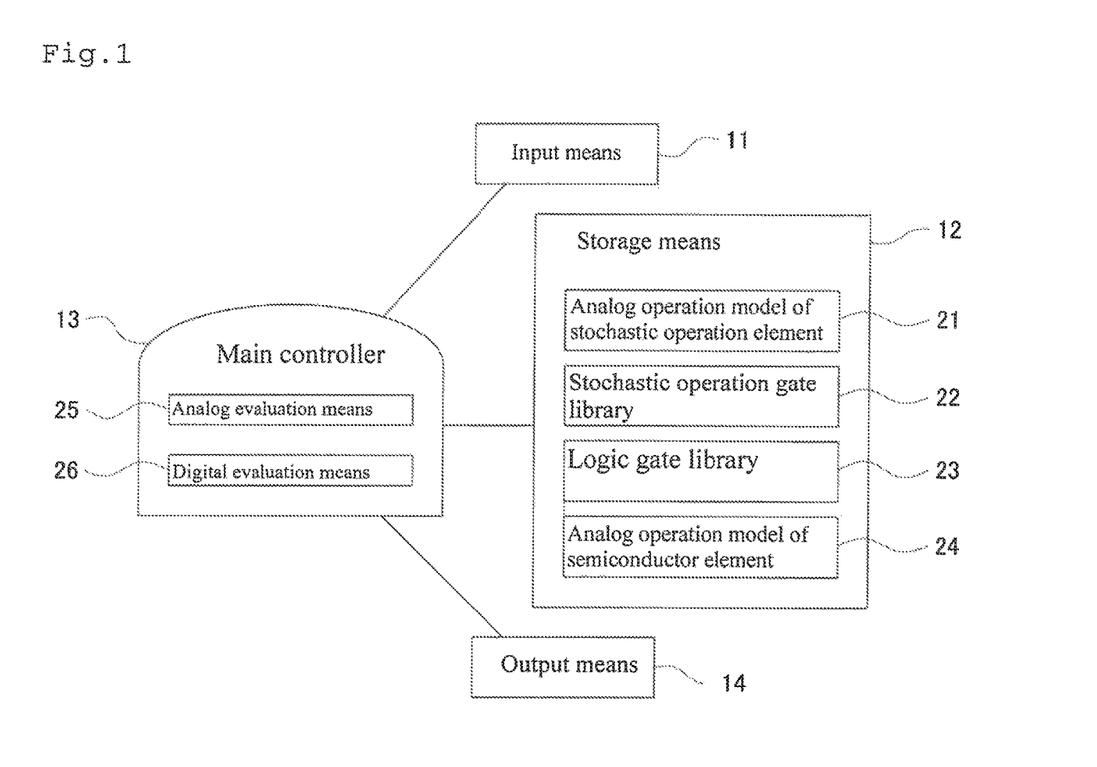
FIG. 1 is a block diagram illustrating the configuration of a circuit design support system of an embodiment of the present invention.

As shown in FIG. 1, the circuit design support system of the embodiment of the present invention is a circuit design support system to support the design of a circuit including a stochastic operation element for which a change of an element value is determined stochastically. The circuit design support system consists of a computer and has an input means 11, a storage means 12 for storing various pieces of data, a main controller 13 having an arithmetic operation function and a control function, and an output means 14.

The input means 11 consists of a reading device to read information stored in a storage medium (e.g., keyboard, CD-R, DVD-R) for example. The input means 11 can be used to input circuit information described in a hardware description language (HDL) corresponding to a circuit to be designed. The input means 11 also can be used to input various pieces of data.

The storage means 12 consists of a memory and is configured to store in advance an analog operation model 21 of a stochastic operation element inputted from the input means 11, a stochastic operation gate library 22, a logic gate library 23, and a semiconductor element analog operation model 24. The analog operation model 21 of the stochastic operation element has information stochastically showing a change of the element value of the stochastic operation element. The stochastic operation gate library 22 has information showing the operation based on the stochastic change of the element value of the stochastic operation element of a logic gate including the stochastic operation element. The logic gate library 23 has such information showing the operation of a logic gate not including the stochastic operation element that is calculated in advance based on the semiconductor element analog operation model 24.

The main controller 13 consists of a CPU and is configured to be connected to the input means 11, the storage means 12, and the output means 14 so as to be able to control the respective means. The main controller 13 has an analog evaluation means 25 and a digital evaluation means 26. The analog evaluation means 25 is configured to calculate the element value of the stochastic operation element by performing an analog simulation based on circuit information inputted from the input means 11, the analog operation model 21 of the stochastic operation element stored in the storage means 12, the stochastic operation gate library 22, and the logic gate library 23. Specifically, the analog evaluation means 25 is configured to calculate an input signal to the stochastic operation element based on the circuit information, the stochastic operation gate library 22, and the logic gate library 23 to use the input signal to calculate the element value of the stochastic operation element based on the analog operation model 21 of the stochastic operation element. The analog evaluation means 25 performs the operation evaluation by calculating a difference between the calculated element value of the stochastic operation element and an ideal value calculated in advance.

The digital evaluation means 26 is configured to perform the logical synthesis on the circuit information inputted from the input means 11, the stochastic operation gate library 22 stored in the storage means 12, and the logic gate library 23 to perform the digital simulation to calculate output values from each logic gate and the entire circuit. The output values from each logic gate and the entire circuit are calculated using the element value of the stochastic operation element calculated by the analog evaluation means 25. The digital evaluation means 26 performs the operation evaluation by calculating a difference between the calculated output values and the respective ideal values calculated in advance.

The main controller 13 is configured to send, to the storage means 12, the difference calculated by the digital evaluation means 26 between the output value of each logic gate and the ideal value, the difference between the output value from the entire circuit and the ideal value, and the difference calculated by the analog evaluation means 25 between the element value of the stochastic operation element and the ideal value so that the differences can be stored in the storage means 12.

The output means 14 consists of a monitor or a printer for example. The output means 14 is configured to output, as write error profile data, the difference stored in the storage means 12 between the output value of each logic gate and the ideal value, the difference between the output value from the entire circuit and the ideal value, and the difference between the element value of the stochastic operation element and the ideal value, respectively.

Figure 2:
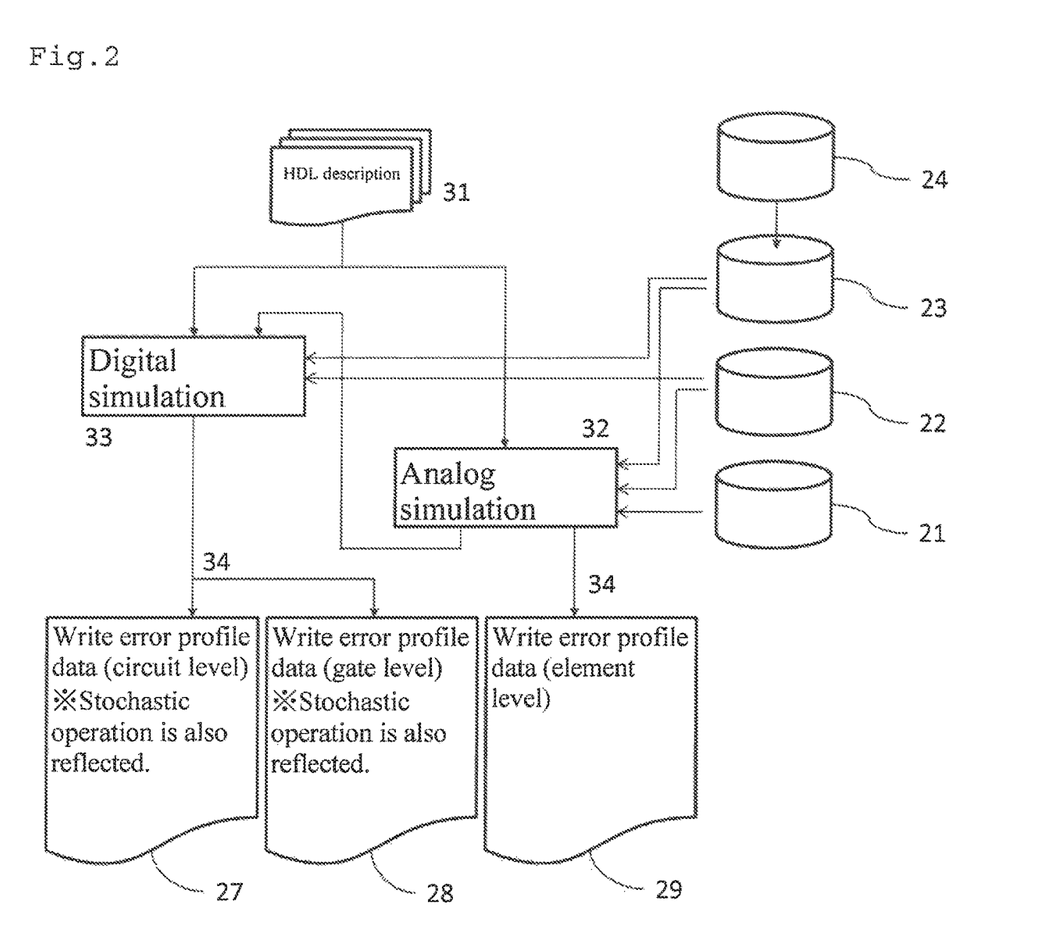
FIG. 2 is a flowchart illustrating the processing procedure of the circuit design support system of an embodiment of the present invention.

Next, the following section will describe the processing procedure of the circuit design support system of the embodiment of the present invention with reference to FIG. 2. As shown in FIG. 2, the circuit information described in the hardware description language (HDL) is firstly inputted from the input means 11 (step 31). Next, the analog evaluation means 25 performs the analog simulation based on the circuit information, the analog operation model 21 of the stochastic operation element stored in advance in the storage means 12, the stochastic operation gate library 22, and the logic gate library 23 to calculate the element value of each stochastic operation element to calculate a difference between the element value and the ideal value (step 32).

Next, the digital evaluation means 26 performs the logic synthesis on the circuit information, the stochastic operation gate library 22 stored in advance in the storage means 12, and the logic gate library 23 calculated from the semiconductor element analog operation model 24 to perform the digital simulation using the element value of each stochastic operation element obtained in step 32 to calculate the output values from each logic gate and the entire circuit to calculate the differences between the output values and the respective ideal values (step 33). Next, the output means 14 outputs, as circuit level write error profile data 27, the difference between the output value from the entire circuit and the ideal value and outputs, as gate level write error profile data 28, the difference between the output value of each logic gate and the ideal value and outputs, as element level write error profile data 29, the difference between the element value of the stochastic operation element and the ideal value (step 34).

As described above, the circuit design support system of the embodiment of the present invention can evaluate the influence caused by the stochastic operation of the stochastic operation element on the operation reliability of the circuit based on the write error profile data 27 to 29 at the respective levels of the stochastic operation element, each logic gate, and the circuit. Based on this evaluation, a design considering the stochastic operation of the stochastic operation element such as a design of a circuit for maximizing the performance of the stochastic operation element can be performed for example. Specifically, this system can be preferably used to design a circuit for which only a certain quality is required and thus noise or error may be allowed and thus 100% reliability is not required such as a circuit related to an image processing or artificial intelligence.

Figure 3:
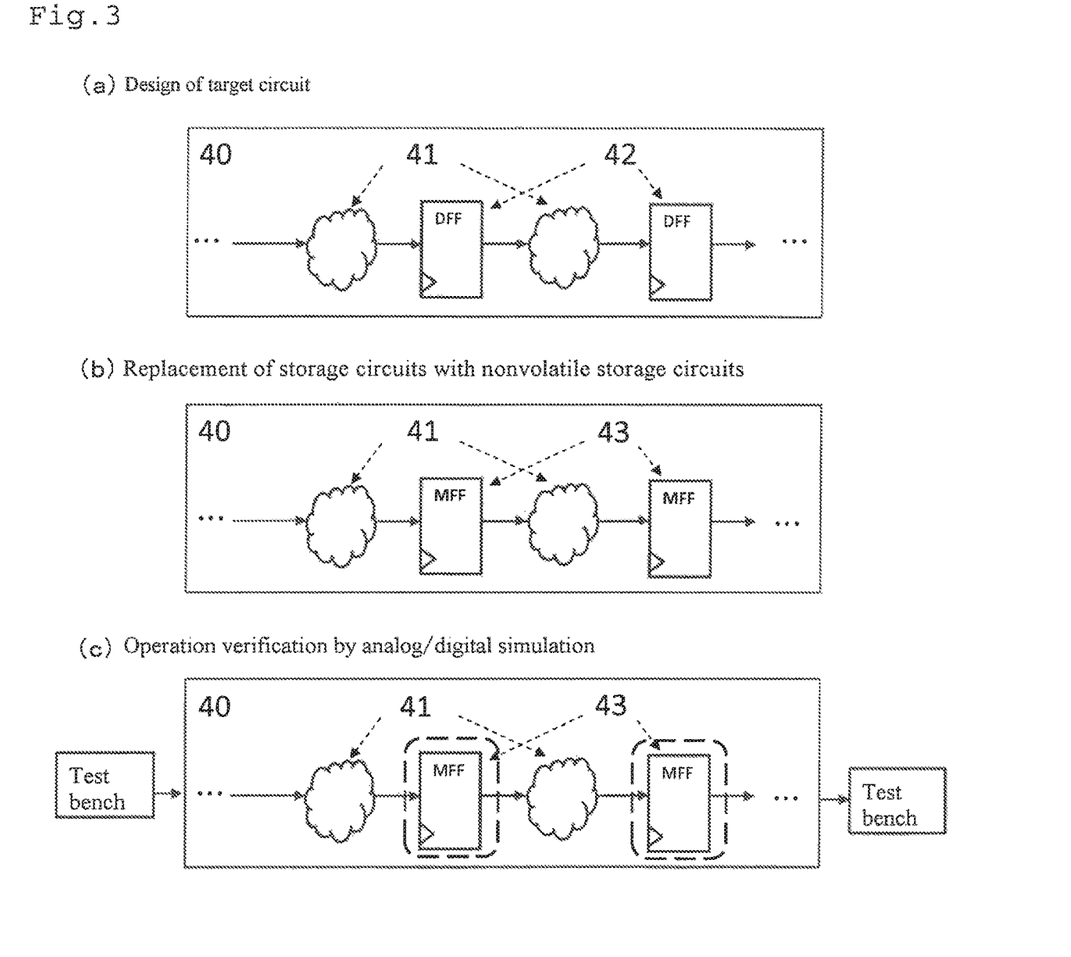
FIG. 3 is a block circuit diagram illustrating an example of the flow of a circuit design using the circuit design support system of an embodiment of the present invention.
Figure 4:
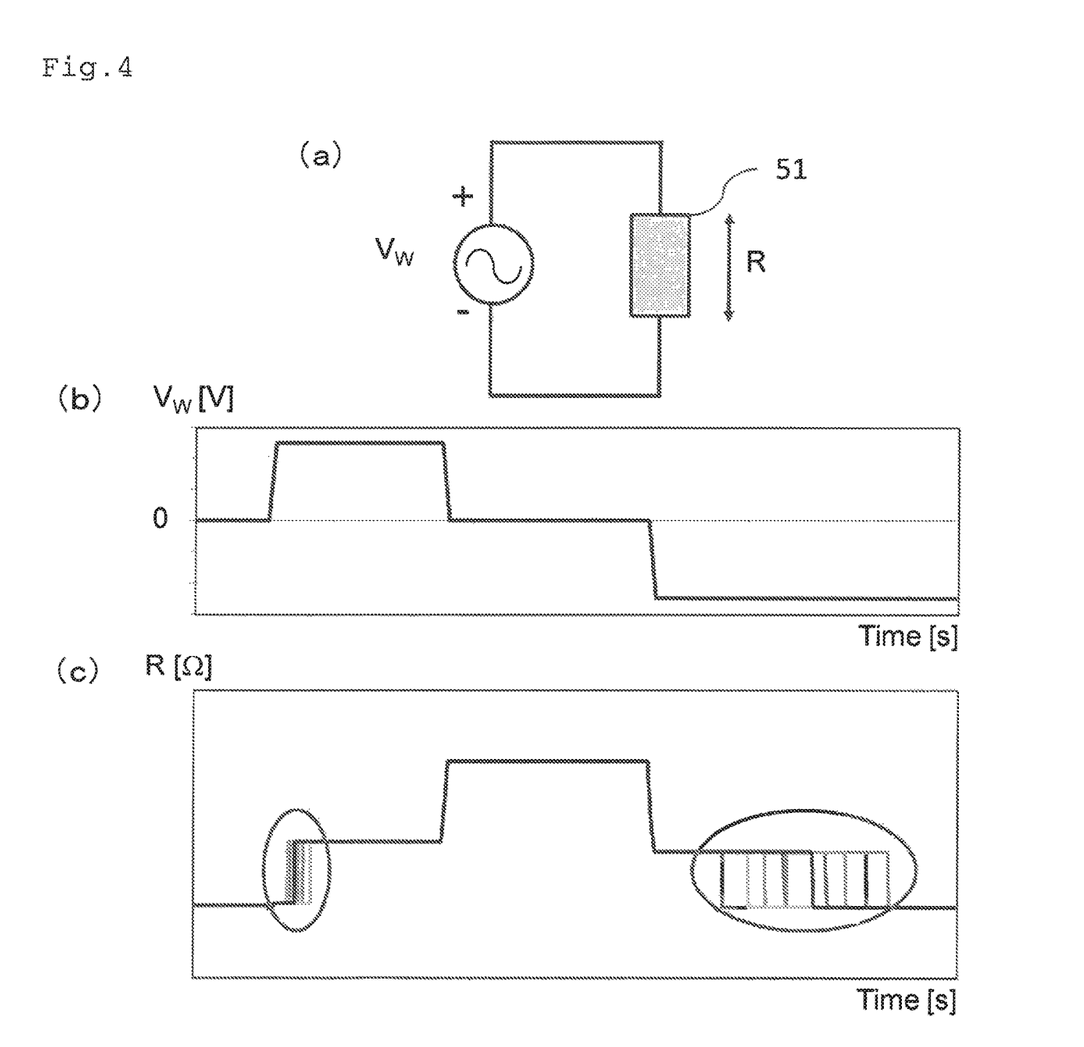
FIG. 4(a) illustrates a circuit model.
FIG. 4(b) is a graph illustrating an application voltage.
FIG. 4(c) is a graph illustrating a change of an element value showing the calculation result.

FIG. 3 illustrates an example of an actual circuit design flow using the circuit design support system of the embodiment of the present invention. First, as shown in FIG. 3(a), the design of a target circuit 40 is performed using a combinational logic circuit section 41 not including the stochastic operation element and a storage circuit 42 consisting of D flip-flop (DFF) for example. Next, as shown in FIG. 3(b), the storage circuit 42 is replaced with a nonvolatile storage circuit 43 consisting of a nonvolatile magnetic flip-flop (MFF) including the stochastic operation element for example. Next, as shown in FIG. 3(c), according to the circuit design support system of the embodiment of the present invention, the stochastic operation element of the nonvolatile storage circuit 43 is subjected to the analog simulation by the analog evaluation means 25 and the combinational logic circuit section 41 and the entire target circuit 40 are subjected to the digital simulation by the digital evaluation means 26 so that the operation verification of the target circuit 40 at the respective levels is performed.

The circuit design support program of the embodiment of the present invention is provided while being recorded in a computer readable recording medium such as CD (e.g., CD-ROM, CD-R, CD-RW), DVD (e.g., DVD-ROM, DVD-RAM, DVD-R, DVD-RW, DVD+R, DVD+RW), or a USB memory. In this case, the computer can read the circuit design support program from the recording medium to transfer the circuit design support program to an internal storage device or an external storage device of the computer and store the circuit design support program therein. The circuit design support program of the embodiment of the present invention also may be recorded in a storage device (recording medium) such as a magnetic disk, an optical disk, or a magneto-optical disk to provide the program from the storage device to the computer via a communication line.

The computer is a concept including hardware and OS (operating system) and means hardware operating under the control by the OS. When no OS is required and hardware is allowed to operate by an application program only, the hardware itself corresponds to the computer. The hardware includes at least a microprocessor such as CPU and a means for reading the computer program recorded in the recording medium.

An application program as the circuit design support program of the embodiment of the present invention includes a program code realized by the computer as described above. The function may be partially realized not by the application program but by the OS. The computer readable recording medium of the embodiment of the present invention includes the above-described flexible disk, CD, DVD, USB memory, magnetic disk, optical disk, or magneto-optical disk, the internal storage device (e.g., a memory such as RAM or ROM) or the external storage device of the computer, or various computer readable media such as a printed matter on which a sign such as a bar code is printed.

[Confirmation of the Stochastic Operation of the Stochastic Operation Element]

In order to confirm that the stochastic operation element performs the stochastic operation, the simulation was performed using a simple circuit model using an MTJ element as a nonvolatile resistance change element as a stochastic operation element 51. By using SPICE, a circuit model having only one MTJ element shown in FIG. 4(a) is used to calculate a change of the element value (resistance value) of the MTJ element when the voltage shown in FIG. 4(b) was applied thereto. FIG. 4(c) shows the calculation result. As shown in FIG. 4(c), the change of the element value occurs at a different timing even when a fixed voltage is applied (the circles sections in the drawing), thus demonstrating that the stochastic operation was performed by the MTJ element.

Example 1

The target circuit including 476 nonvolatile magnetic flip-flops was simulated using the circuit design support system of the embodiment of the present invention. The target circuit includes an MTJ element as a stochastic operation element within each nonvolatile magnetic flip-flop. For comparison, the simulation was also performed using the conventional circuit design support system (conventional system) as shown in FIG. 8. This conventional system is configured to perform such operations that, when a probability of a change of the element value of the stochastic operation element is equal to or more than a certain value, then the probability is increased to 100% and, when the probability is equal to or less than a certain value, then the probability is decreased to 0%. Specifically, the conventional system is configured so that, when "pulse size×pulse width" given to the MTJ element exceeds a predetermined threshold value, then the element value (resistance value) of the MTJ element changes and, when "pulse size×pulse width" given to the MTJ element does not exceed the predetermined threshold value, then the element value of the MTJ element does not change.

Figure 5:
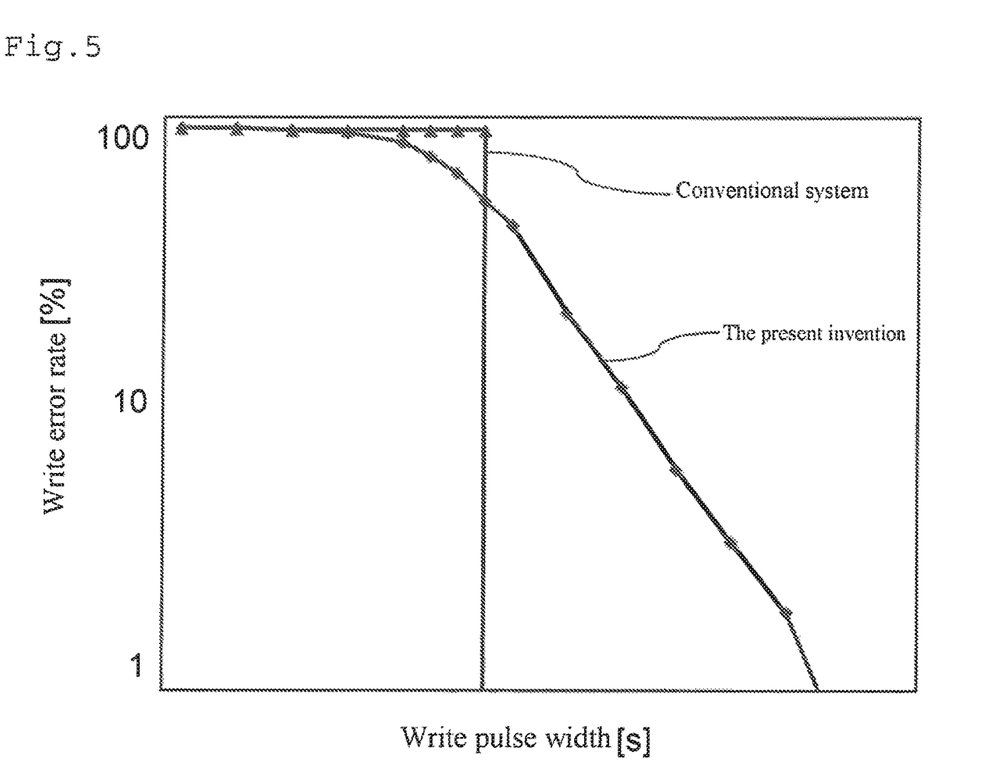
FIG. 5 is a graph illustrating, regarding the circuit design support system of an embodiment of the present invention and a conventional system, the relation between a write pulse width and a write error rate in the simulation result of a target circuit including a nonvolatile magnetic flip-flop.

FIG. 5 shows the relation between the write pulse width and the write error rate obtained through the respective simulations when performing write processing on the respective nonvolatile magnetic flip-flops (gate levels). It is noted that a fixed write pulse size was used. As shown in FIG. 5, the conventional system is configured so that, when the write pulse width has a value equal to or lower than a predetermined value, the write error rate is 100% and, when the write pulse width has a value higher than the predetermined value, then the write error rate is 0%. On the other hand, it was confirmed that the circuit design support system of the embodiment of the present invention provided the write error rate gradually decreasing with an increase of the write pulse width and the stochastic operation of the stochastic operation element allows the operation to stochastically change also at the gate level.

As described above, according to the circuit design support system of the embodiment of the present invention, the influence caused by the stochastic operation of the stochastic operation element on the circuit operation and the circuit operation margin can be more accurately evaluated at multi-layer design levels. This can consequently provide a highly-reliable design and a high-performance design.

Example 2

Figure 6:
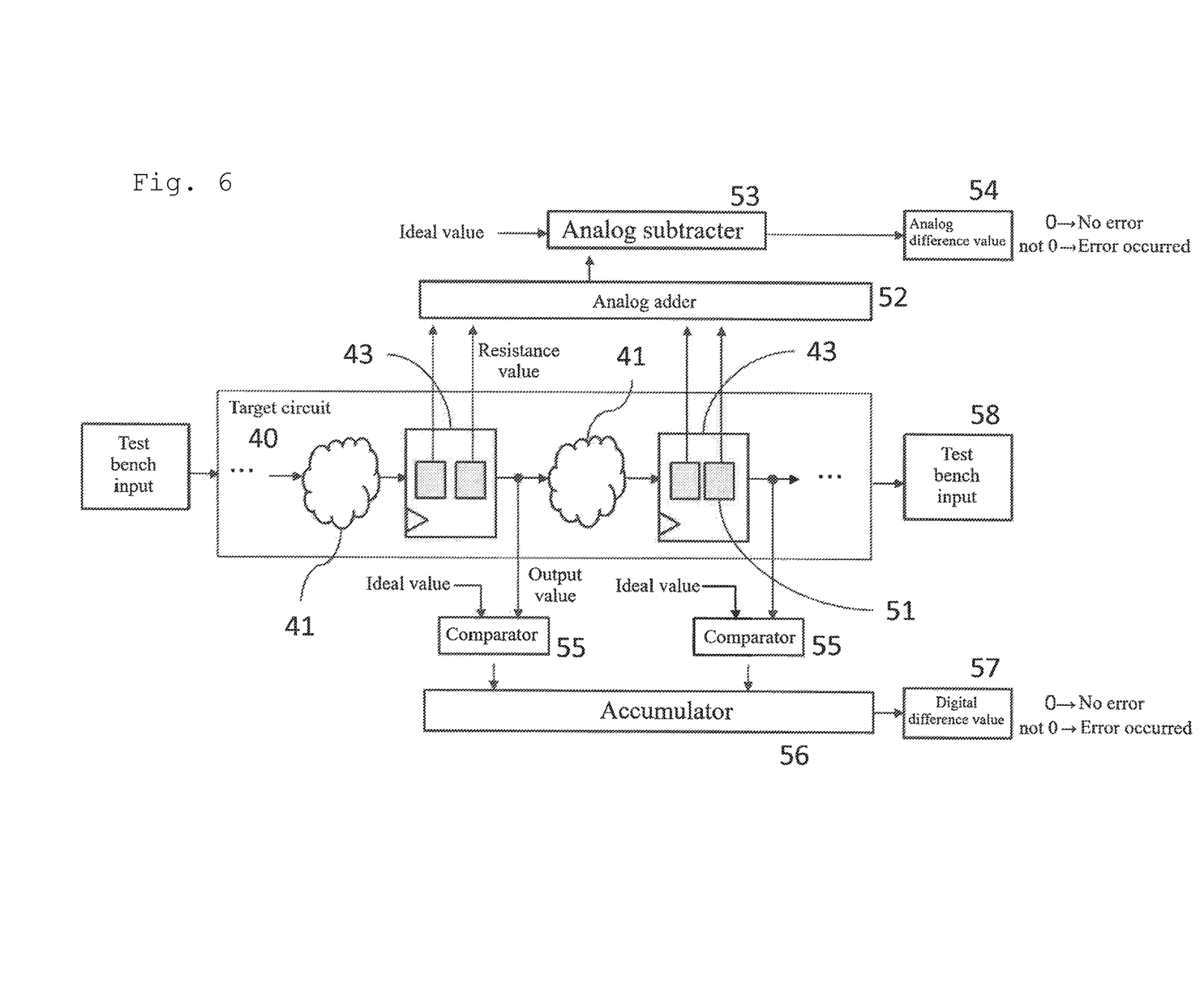
FIG. 6 is a block circuit diagram illustrating the flow of the evaluation of the simulation using a general-purpose microprocessor circuit using the circuit design support system of an embodiment of the present invention.

Cortex-M0 (made by ARM) as a general-purpose 32-bit microprocessor was used as the target circuit 40. The target circuit 40 was simulated using the circuit design support system of the embodiment of the present invention. The flow of the evaluation of the simulation is shown in FIG. 6. As shown in FIG. 6, the element value of each stochastic operation element 51 obtained by the analog evaluation means 25 is added by an analog adder 52 to allow an analog subtracter 53 to calculate a difference between the addition value and an ideal value to output the resultant difference as an analog difference value 54. This analog difference value 54 is used as write error profile data 29 at the element level. This consequently allows, when each stochastic operation element 51 has no write error, the analog difference value 54 to be 0. When the analog difference value 54 is not 0, this shows that a write error occurs and the analog difference value 54 can show that some stochastic operation elements 51 have a write error.

As shown in FIG. 6, the output value from each logic gate obtained by the digital evaluation means 26 is compared by the corresponding comparator 55 with each ideal value to calculate a difference therebetween. The resultant differences from the respective comparators 55 are accumulated by an accumulator 56 to output the resultant digital difference value 57. This digital difference value 27 is used as gate level write error profile data 28. Thus, when each logic gate has no write error, the digital difference value 57 is 0. When the digital difference value 57 is not 0, this shows the occurrence of a write error. Thus, this digital difference value 57 shows the number of logic gates that have a write error. The output value of the entire circuit obtained by the digital evaluation means 26 is outputted as test bench output 58.

Figure 7:
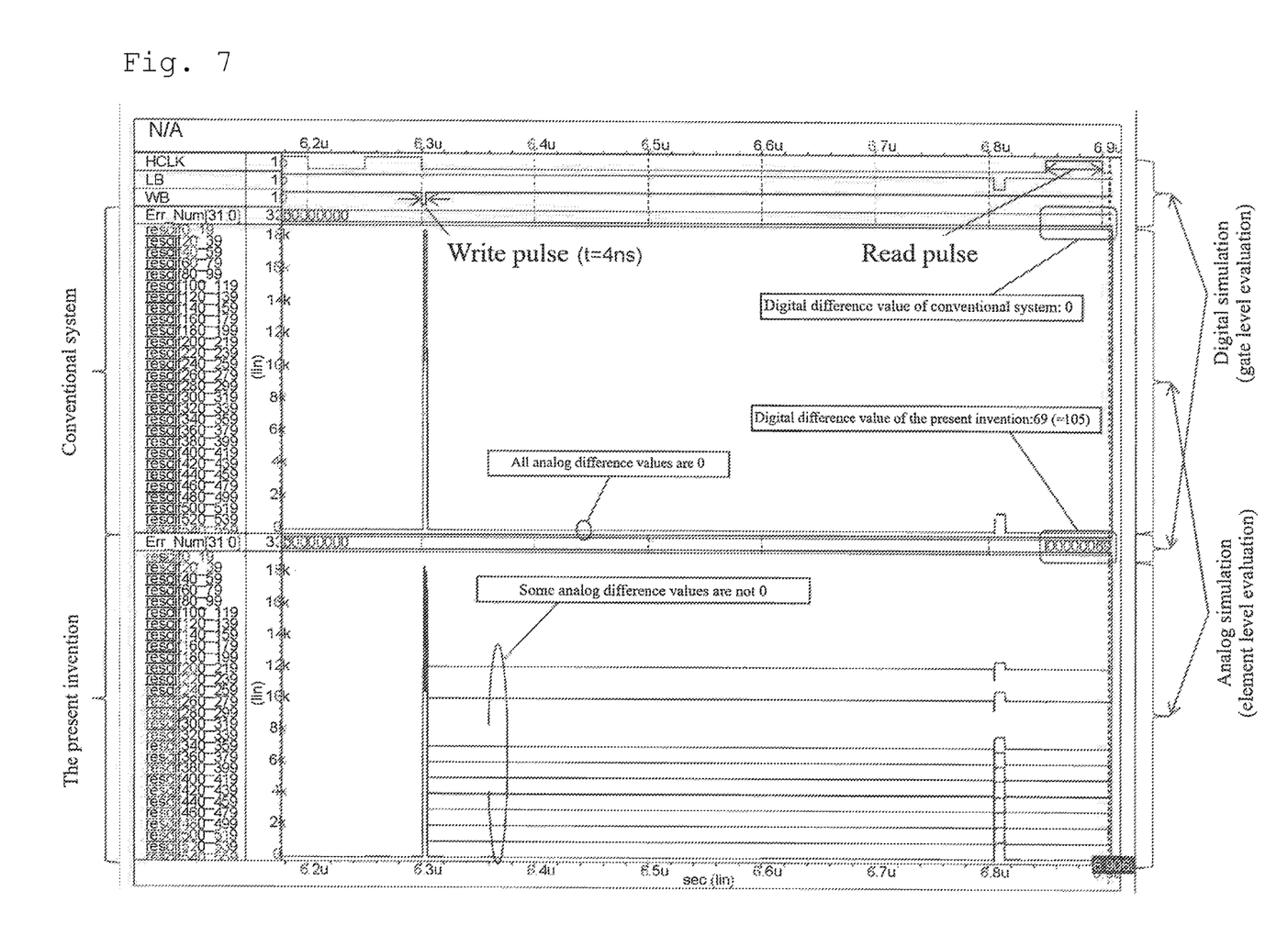
FIG. 7 illustrates the simulation result using the circuit design support system of an embodiment of the present invention shown in FIG. 6 and a conventional system.

The actual simulation result is shown in FIG. 7. For comparison, FIG. 7 also shows the simulation result obtained through the similar evaluation by the conventional system. In FIG. 7, 20 stochastic operation elements 51 are set as one combination and the analog difference value 54 is outputted for each combination. The write pulse width was 4 nsec. As shown in FIG. 7, the conventional system shows that the analog difference values 54 at the element level are all 0 and the digital difference value 57 at the gate level is also 0. In contrast with this, the circuit design support system of the embodiment of the present invention shows that some combinations do not have 0 in the analog difference value 54 at the element level, thus showing that some stochastic operation elements 51 have a write error. The digital difference value 57 at the gate level is a hexadecimal number "69", showing that 105 logic gates have a write error.

As described above, the circuit design support system of the embodiment of the present invention provides a result different from that of the conventional system, thus presumably providing a more-accurate evaluation of the actual stochastic operation of the stochastic operation element at the element level, the gate level, and the circuit level.

REFERENCE SIGNS LIST

11: Input means
12: Storage means
21: Analog operation model of stochastic operation element 22: Stochastic operation gate library
23: Logic gate library
24: Analog operation model of semiconductor element
13: Main controller
25: Analog evaluation means
26: Digital evaluation means
14: Output means
27: (Circuit level) write error profile data
28: (Gate level) write error profile data
29: (Element level) write error profile data
40: Target circuit
41: Combinational logic circuit section
42: Storage circuit
43: Nonvolatile storage circuit
51: Stochastic operation element
52: Analog adder
53: Analog subtracter
54: Analog difference value
55: Comparator
56: Accumulator
57: Digital difference value
58: Test bench output
101: Circuit information
102: Logic gate library
103: Analog operation model of semiconductor element
104: Digital simulation
105: (Circuit level) write error profile data
106: (Gate level) write error profile data

What is claimed is:

1. A circuit design support system for supporting a design of a circuit including a stochastic operation element for which a change of an element value is determined stochastically, the circuit design support system comprising:
a storage means storing in advance therein an analog operation model having information stochastically showing a stochastic change of an element value of the stochastic operation element, a stochastic operation gate library having information showing an operation based on the stochastic change of the element value of the stochastic operation element of a logic gate including the stochastic operation element, and a logic gate library having information showing an operation of a logic gate not including the stochastic operation element;
a digital evaluation means for logically synthesizing circuit information described in a hardware description language (HDL) corresponding to the circuit, the stochastic operation gate library stored in the storage means, and the logic gate library stored in the storage means to perform an operation evaluation of each logic gate and the circuit; and
an analog evaluation means for performing the operation evaluation of the stochastic operation element based on the circuit information, the analog operation model stored in the storage means, the stochastic operation gate library stored in the storage means, and the logic gate library stored in the storage means.

2. The circuit design support system according to claim 1, wherein: the analog evaluation means is configured to calculate an input signal to the stochastic operation element based on the circuit information, the stochastic operation gate library, and the logic gate library to use the input signal to perform the operation evaluation of the stochastic operation element based on the analog operation model.

3. The circuit design support system according to claim 2, wherein:
the analog evaluation means is configured to calculate the element value of the stochastic operation element to perform the operation evaluation by comparing the element value with an ideal value, and
the digital evaluation means is configured to perform the operation evaluation by calculating the output value of each logic gate and the output value of the circuit to compare the output values with associated ideal values, respectively.

4. The circuit design support system according to claim 3, wherein:
the digital evaluation means is configured to use the element value of the stochastic operation element calculated by the analog evaluation means to calculate the output value of each logic gate and the output value of the circuit.

5. The circuit design support system according to claim 1, wherein:
the analog evaluation means is configured to calculate the element value of the stochastic operation element to perform the operation evaluation by comparing the element value with an ideal value, and
the digital evaluation means is configured to perform the operation evaluation by calculating the output value of each logic gate and the output value of the circuit to compare the output values with associated ideal values, respectively.

6. The circuit design support system according to claim 5, wherein:
the digital evaluation means is configured to use the element value of the stochastic operation element calculated by the analog evaluation means to calculate the output value of each logic gate and the output value of the circuit.

7. A circuit design support method for supporting a design of a circuit including a stochastic operation element for which a change of an element value is determined stochastically, the circuit design support method comprising:
a storage step of storing in advance an analog operation model having information stochastically showing a stochastic change of an element value of the stochastic operation element, a stochastic operation gate library having information showing an operation based on the stochastic change of the element value of the stochastic operation element of a logic gate including the stochastic operation element, and a logic gate library having information showing an operation of a logic gate not including the stochastic operation element;
a digital evaluation step of logically synthesizing circuit information described in a hardware description language (HDL) corresponding to the circuit, the stochastic operation gate library stored in the storage step, and the logic gate library stored in the storage step to perform an operation evaluation of each logic gate and the circuit; and
an analog evaluation step of performing the operation evaluation of the stochastic operation element based on the circuit information, the analog operation model stored in the storage step, the stochastic operation gate library stored in the storage step, and the logic gate library stored in the storage step.

8. A circuit design support program for supporting a design of a circuit including a stochastic operation element for which a change of an element value is determined stochastically, the circuit design support program allows a computer to function as:

a storage means storing in advance therein an analog operation model having information stochastically showing a stochastic change of an element value of the stochastic operation element, a stochastic operation gate library having information showing an operation based on the stochastic change of the element value of the stochastic operation element of a logic gate including the stochastic operation element, and a logic gate library having information showing an operation of a logic gate not including the stochastic operation element;

a digital evaluation means for logically synthesizing circuit information described in a hardware description language (HDL) corresponding to the circuit, the stochastic operation gate library stored in the storage means, and the logic gate library stored in the storage means to perform an operation evaluation of each logic gate and the circuit; and an analog evaluation means for performing the operation evaluation of the stochastic operation element based on the circuit information, the analog operation model stored in the storage means, the stochastic operation gate library stored in the storage means, and the logic gate library stored in the storage means.

9. A non-transitory computer readable recording medium having a circuit design support program recorded thereon to support a design of a circuit including a stochastic operation element for which a change of an element value is determined stochastically, the computer readable recording medium has a circuit design support program recorded thereon that allows a computer to function as:

a storage means storing in advance therein an analog operation model having information stochastically showing a stochastic change of an element value of the stochastic operation element, a stochastic operation gate library having information showing an operation based on the stochastic change of the element value of the stochastic operation element of a logic gate including the stochastic operation element, and a logic gate library having information showing an operation of a logic gate not including the stochastic operation element;

a digital evaluation means for logically synthesizing circuit information described in a hardware description language (HDL) corresponding to the circuit, the stochastic operation gate library stored in the storage means, and the logic gate library stored in the storage means to perform an operation evaluation of each logic gate and the circuit; and an analog evaluation means for performing the operation evaluation of the stochastic operation element based on the circuit information, the analog operation model stored in the storage means, the stochastic operation gate library stored in the storage means, and the logic gate library stored in the storage means.

\* \* \* \* \*